United States Patent [19]

Lindén

[11] Patent Number: 5,689,888
[45] Date of Patent: Nov. 25, 1997

[54] VARIABLE FORCE TOOL

[75] Inventor: Erkki Olavi Lindén, Billnäs, Finland

[73] Assignee: Fiskars Consumer Oy Ab, Billnas, Finland

[21] Appl. No.: 702,122

[22] Filed: Aug. 20, 1996

[51] Int. Cl.⁶ .................................................. B26B 13/00
[52] U.S. Cl. .................................................. 30/250; 30/192
[58] Field of Search ........................ 30/188, 190–193, 30/249–251, 254, 252, 238; 81/364, 366

[56] References Cited

U.S. PATENT DOCUMENTS

| | | | |
|---|---|---|---|
| 107,577 | 9/1870 | Will | 30/250 |
| 147,868 | 2/1874 | Seger et al. | 30/259 |
| 199,065 | 1/1878 | Hixson . | |
| 248,996 | 11/1881 | Burdick | 30/250 X |
| 512,086 | 1/1894 | Ashcraft | 30/188 X |
| 766,941 | 8/1904 | Eddleman | 30/243 |
| 863,111 | 8/1907 | Smohl . | |
| 1,065,753 | 6/1913 | Whitney | 30/250 |
| 1,395,758 | 11/1921 | Maszczyk | 30/250 |
| 1,689,648 | 10/1928 | Voleske . | |
| 1,915,404 | 6/1933 | Clifton . | |
| 2,384,822 | 9/1945 | Drmic | 30/250 |
| 3,372,478 | 3/1968 | Wallace et al. . | |
| 4,378,636 | 4/1983 | Wick | 30/250 X |
| 4,420,883 | 12/1983 | Wallace et al. | 30/231 |
| 5,020,222 | 6/1991 | Gosselin et al. | 30/251 |

FOREIGN PATENT DOCUMENTS

4023559C2  8/1995  Germany .

Primary Examiner—Douglas D. Watts
Attorney, Agent, or Firm—Foley & Lardner

[57] ABSTRACT

A variable force lopping tool is provided with a gear mechanism configured so that maximum leverage is obtained at a point in the cutting stroke corresponding to the maximum resistance by the workpiece being cut. The mechanism comprises a pair of mating gears formed on first and second elongated members and cooperating with a plate having a forwardly extending jaw or blade. The plate is pivotally connected to the first member. The second member is pivotally connected to a rearwardly extending tang of the plate.

20 Claims, 8 Drawing Sheets

VARIABLE FORCE TOOL

FIELD OF THE INVENTION

The present invention relates, generally, to variable force tools and particularly to variable force cutting tools such as loppers.

BACKGROUND OF THE INVENTION

Cutting heavy growth such as tree limbs on the order of one to two inches in diameter (approx. 25 to 50 mm) typically requires considerable force. Lopping shears for cutting such heavy growths typically comprise a pair of elongated members disposed for cooperative engagement about a pivot point. Such lopping shears generally include a pair of opposed jaws, such as a blade cooperating with an anvil, or a pair of blades. In these shears, the jaws, which are typically made of stamped or forged metal or other suitable material, have an opposed force applying end or tang connected to a long handle. The long handle configuration gives the user the extra leverage needed to perform the cutting operation, and provides extended reach to trim distant tree branches and the like. Loppers with an anvil and a blade are knowingly referred to as "anvil" loppers, while those provided with a pair of cooperating blades are referred to as "bypass" loppers. To effect the severing operation, the handles are pivoted about the pivot point thereby forcing the jaws together or, in the case of a bypass lopper, past one another.

To withstand the forces involved in cutting heavy growth, the relatively long handles of lopping shears must be sufficiently strong. Although these handles are often made of wood, to reduce forearm fatigue, more recent prior art loppers have included hollow handles made of fiberglass or other light weight though sturdy material. In all cases, however, the length of the handles tends to be limited by practical and cost considerations.

Since shearing heavy growth such as tree limbs on the order of two inches (approx. 50 mm) in diameter requires considerable force, to generate the needed cutting force without unduly lengthening the handles, those skilled in the art have applied to lopping or trimming tools the benefits provided by the use of leverage action mechanisms. An example of such a leverage action mechanism is illustrated in U.S. Pat. No. 4,420,883 issued on Dec. 20, 1983 to Wallace, et al. In the '883 patent which discloses a device commonly referred to as a pole mounted tree pruner, the blade cooperates with a hook which is configured to receive a portion of the branch to be severed. A linkage mechanism associated with the cutting blade effects pivotal movement of the blade through the cutting stroke in response to the pulling of an actuating rope by the user. As is readily apparent, tree pruners such as that disclosed in the '883 patent include many components and are relatively cumbersome to use.

Prior art compound action mechanisms have also been used in pruning shears as described in U.S. Pat. No. 147,868 issued on Feb. 24, 1874 to Seger et al.; in U.S. Pat. No. 2,384,822 issued on Sep. 18, 1945 to Drmic; in U.S. Pat. No. 3,372,478 issued on Mar. 12, 1968 to Wallace et al.; and in U.S. Pat. No. 5,020,222 issued Jun. 4, 1991 to Gosselin et al. The '478 patent to Wallace discloses a compound action lopping shears in which the pivot of the jaws is disposed rearwardly of the pivot of the handles thereby reducing the included angle formed between the jaws. While this dual pivot configuration improves the grasping of the workpiece by the jaws, it does not, however, seem to improve the mechanical advantage of such a tool.

Figure 1:
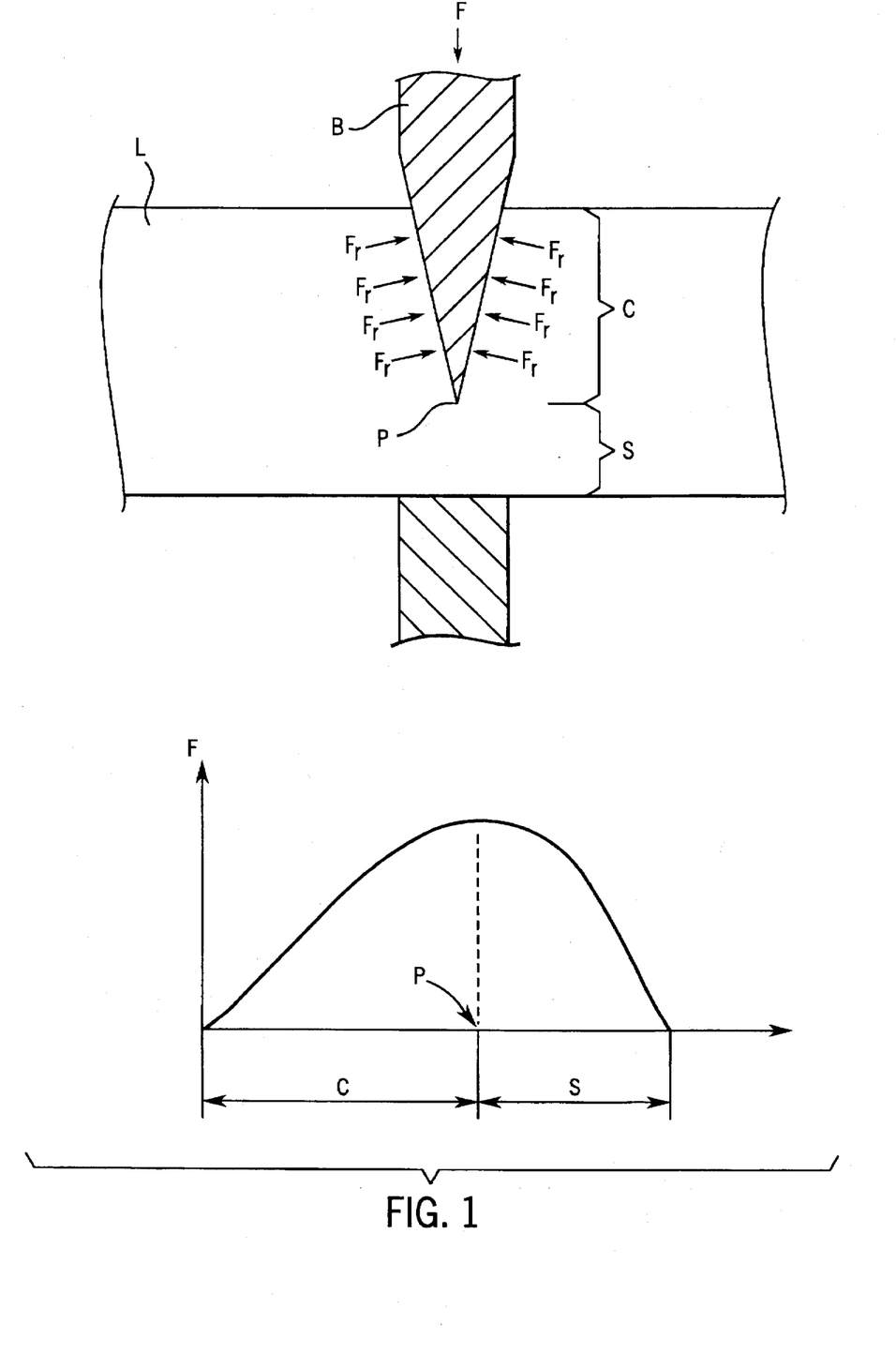
FIG. 1 shows, in schematic form, the penetration of a cutting blade into a growth, illustrating the point at which maximum resistance to the cutting action is typically reached.
Figure 2:
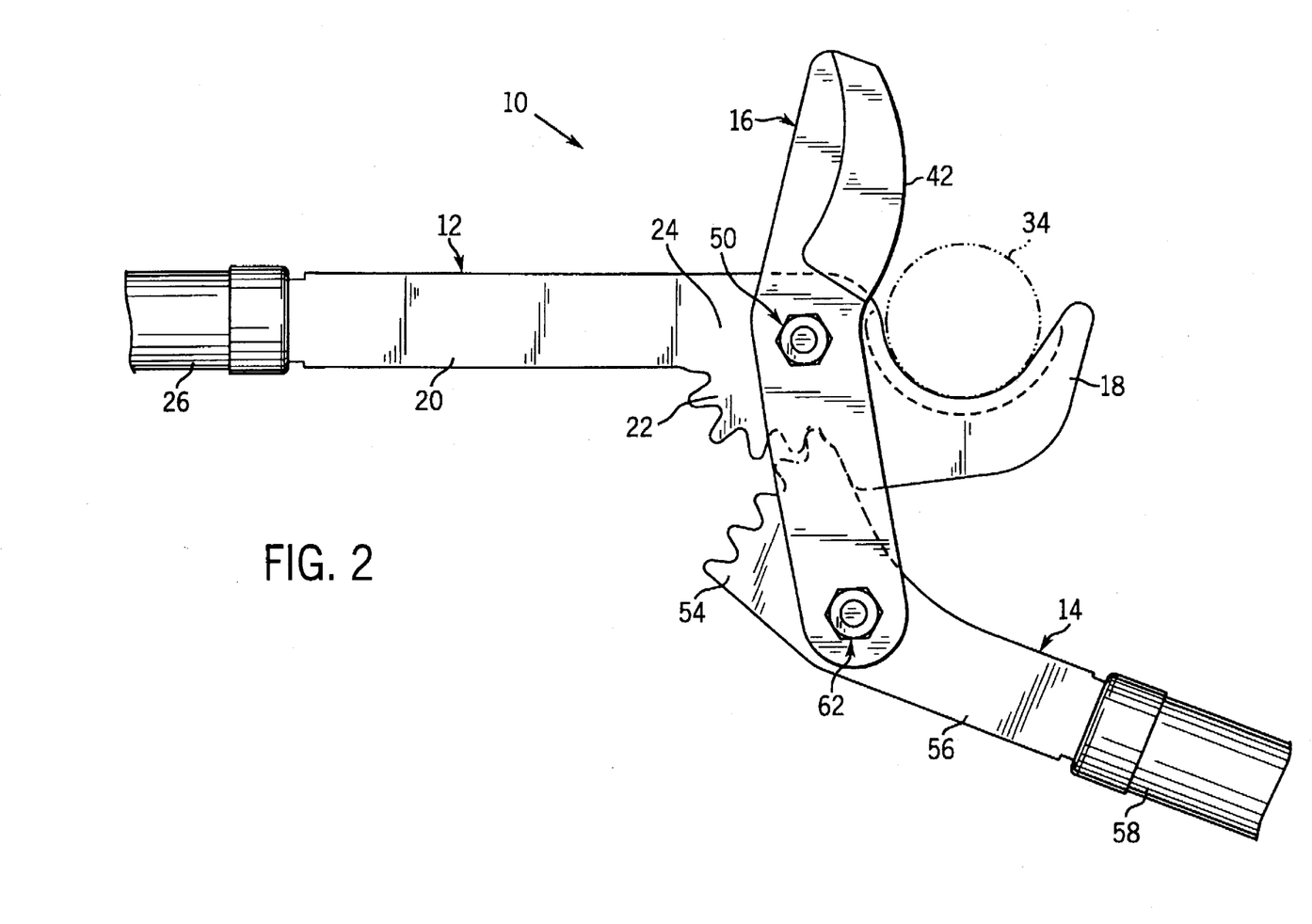
FIG. 2 is a top plan view of a variable force tool in accordance with the present invention, showing a preferred embodiment thereof in fully open position and receiving a workpiece within its bight.
Figure 3:
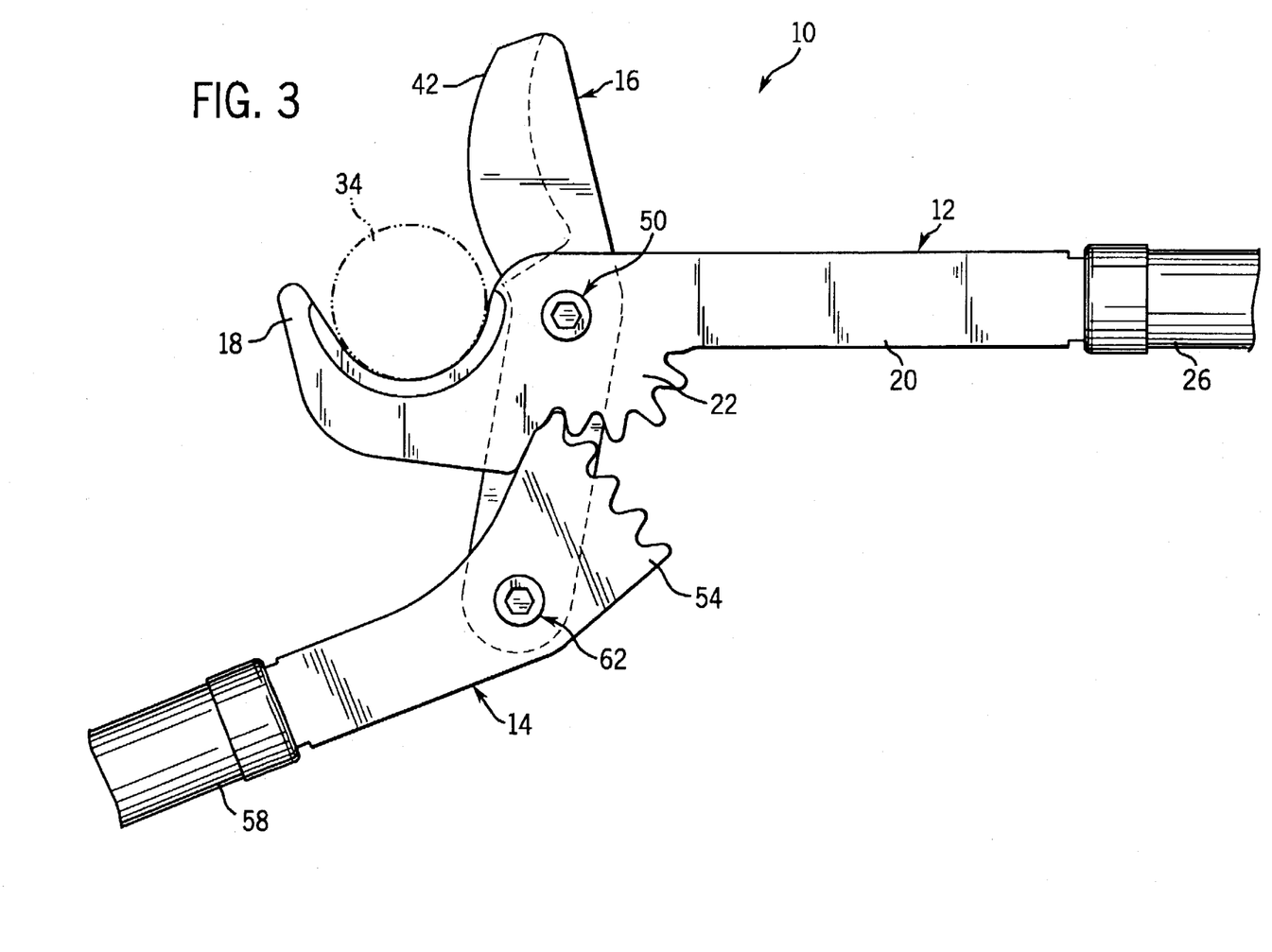
FIG. 3 is a bottom plan view of the lopper of FIG. 2.

As illustrated in FIG. 1, those skilled in the tree trimming art have recognized that the resistance to cutting designated as F presented by a generally round, fibrous growth, such as for example a tree limb L, is not uniform but varies as a function of the penetration of the cutting blade B into the growth. The maximum resistance is typically reached at a point P approximately sixty percent through the cutting stroke. This is because, up to that point, the penetrating action of blade B into limb L results in the compression of an increasing number of fibers as blade B penetrates further into limb L, thereby increasing the density of limb L. As shown in FIG. 1, C represents the region of compression of the fibers of limb L, while $F_r$ represents the friction forces opposing the cutting force applied by a user. Beyond point P which is the point of maximum compression of the fibers, the resistance to the cutting action decreases as the blade begins cutting the fibers (illustrated as region S, where the growth begins being severed and, as a result, the resistance to the cutting action subsides until limb L is entirely severed). It therefore becomes advantageous for a cutting tool to be provided with a variable force mechanism that provides maximum leverage at the point in the cutting stroke corresponding to the maximum resistance to cutting. Gosselin discloses such a compound action lopper in which an additional lever member connected to one of the jaws increases the cutting force transmitted to the jaws, thereby facilitating the cutting operation. Such structure provides the additional leverage desired, without unduly augmenting the length of the handles.

However, these known compound action shears tend to be disadvantageous in a number of respects. For example, in Gosselin, the compound action requires a sliding connection to be effected between the second shearing member and the lever arm. Furthermore, other prior art compound action tools typically include various components which render difficult adjustment of blade tension and removal of the blade for sharpening. In addition, torques applied to the handles of these prior art lopping shears tend to be transmitted to the blades of the shears causing the blades to twist with respect to each other, thereby impeding their cutting function and tending to overload and damage the blade pivot.

The inventor is also aware of other prior art constructions typically used to transmit high torques to the jaws of a cutting tool. Examples of such other tools are described in U.S. Pat. No. 1,689,648 issued Oct. 30, 1928 to Voleske; U.S. Pat. No. 1,065,753 issued Jun. 24, 1913 to Whitney; U.S. Pat. No. 766,941 issued Aug. 9, 1904 to Eddleman; U.S. Pat. No. 107,577 issued Sep. 20, 1870 to Will; and in application Ser. No. 08/484,846 filed on Jun. 7, 1995 to the present inventor. In all of these cases, pivoting movement of at least one of the handles is transmitted to the jaws of the tool by intermeshing concentric gear segments or, as illustrated in Eddleman, by a rack and pinion arrangement. However, these known gear-type cutting implements do not include compound action mechanisms necessary to maximize the cutting force applied to a workpiece received in the jaws at a predetermined point.

In light of the foregoing, it appears desirable to provide a lopping shears which can alleviate the problems associated with conventional items of that kind, i.e., in which the compound action provides an increased mechanical advantage at a predetermined point, but which is nevertheless engineered to draw from the other benefits provided by high torque gear-type cutting tools.

3

SUMMARY OF THE INVENTION

The present invention provides a particularly advantageous variable force gear lever mechanism which is constructed to generate maximum mechanical advantage (i.e., maximum leverage) at the most desirable point through the cutting stroke, without, however, unduly augmenting the overall weight of the shears.

More specifically, in accordance with one aspect of the invention, a variable force cutting tool includes a metal plate provided with a first pivot point spaced apart from a second pivot point by a predetermined distance, the plate having a forwardly extending blade and a rearwardly extending tang. The tool also includes a first elongated member which is pivotally connected to the plate at the first pivot point. The forward portion of the first member is configured as a jaw cooperating with the blade to sever a workpiece received in a bight formed by the jaw. The first member comprises a rearwardly extending arm, to which a handle is preferably attached, and a first gear segment intermediate the jaw and the arm. A second gear segment, formed at the forward portion of a second elongated member, cooperates with the first gear segment when the second member is pivoted to the plate about the second pivot point. The second member also preferably includes a handle mounted on a rearwardly extending portion. The first and second gear segments are intermeshing in first and second regions, respectively, so that the distance separating the second pivot point from the second region varies as the blade travels across the bight.

In accordance with another aspect of the invention, the gear segments are configured so that the distance separating the second pivot point from the second region reaches a minimum at a predetermined point of blade travel across the bight.

In accordance with yet another aspect of the present invention, the variable force geared tool is configured as a lopping shears, which can be of the anvil or bypass type.

Other aspects of the present invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and.

4

DETAILED DESCRIPTION OF A PREFERRED EXEMPLARY EMBODIMENT

Referring to the Figures, a lopper 10 according to the invention includes first and second elongated members 12 and 14, respectively, and a metal plate 16. First elongated member 12 includes a forwardly extending first jaw 18 and a rearwardly extending arm 20. A first gear segment 22 is formed in a region 24 intermediate jaw 18 and arm 20. For added comfort to the user, lopper 10 is provided with a pair of handles. A first handle 26 is suitably configured to receive a portion of arm 20. Preferably, handle 26 has a hollow forward region in which a rearwardly extending portion 28 of arm 20 is press-fit in a manner generally known to those skilled in the art. First member 12 also includes a first aperture 30 formed in region 24 of first gear segment 22. In the preferred embodiment, forwardly extending first jaw 18 forms a bight 32 configured to receive a workpiece 34 to be severed.

Lopper 10 also includes a metal plate 16 having a forwardly extending cooperating jaw 36 and a rearwardly extending tang 38. Cooperating jaw 36 is preferably formed as a blade by grinding operation which yields a bevel 40 of decreasing thickness terminating in an edge grind 42. A second aperture 44 is formed intermediate cooperating jaw 36 and tang 38. Tang 38 is also provided with a third aperture 46 spaced apart from second aperture 44 by a predetermined distance. Metal plate 16 is pivotally joined to first member 12 at a first pivot point 50. Pivot point 50 advantageously includes a bolt 52 engaging first and second apertures, 30, 44, respectively.

Second elongated member 14 includes a second gear segment 54 and an opposed portion 56 on which a second handle 58 is mounted in the same manner provided for handle 26. Member 14 also includes a fourth aperture 60 formed intermediate second gear segment 54 and portion 56. Second member 14 is pivotally joined to plate 16 at a second pivot point 62. Second pivot point 62 advantageously includes a bolt 64 engaging third and fourth apertures, 46, 60, respectively.

Figure 12:
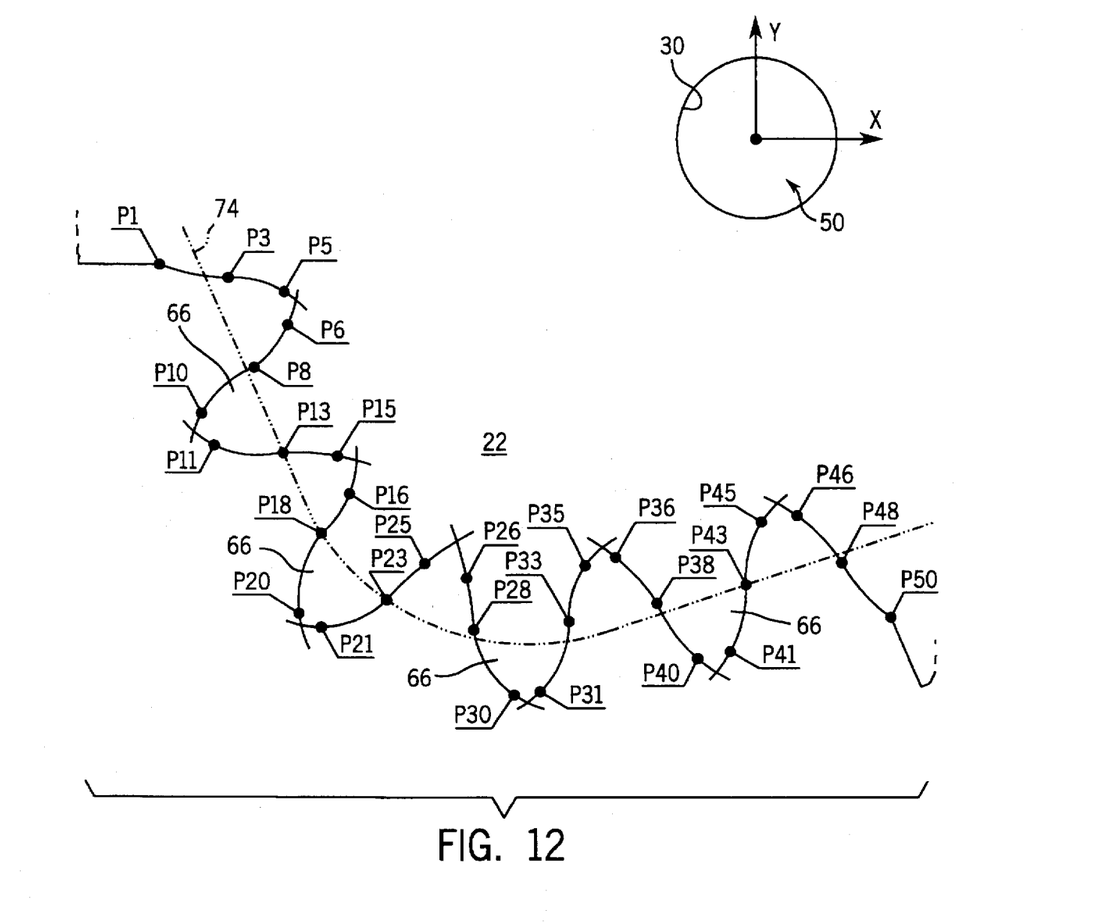
FIG. 12 represents an enlarged detailed illustration of the tooth configuration of the first gear segment of the first elongated member shown in FIG. 8.
Figure 13:
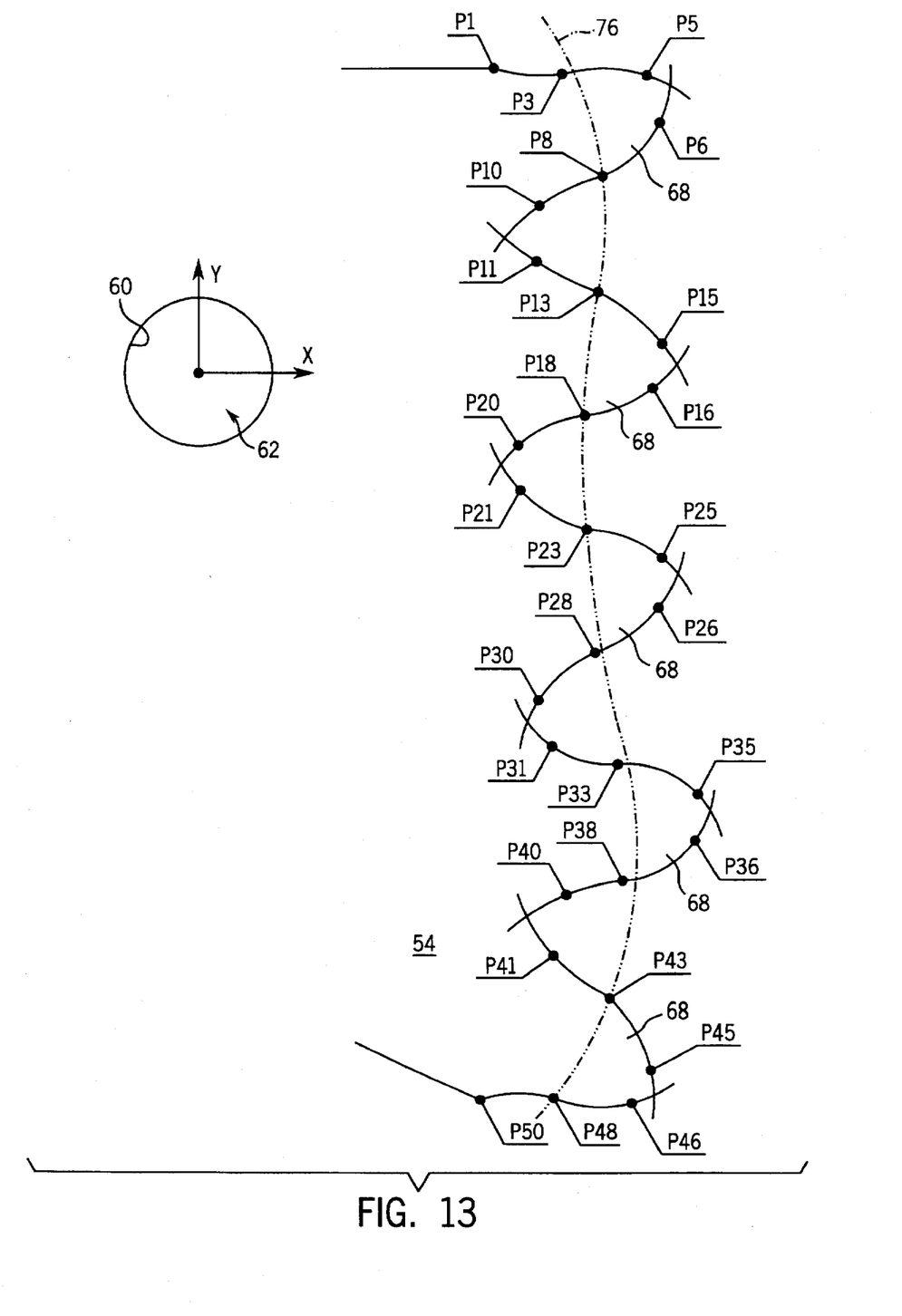
FIG. 13 represents an enlarged detailed illustration of the tooth configuration of the second gear segment of the second elongated member shown in FIG. 10.

Referring now more particularly to FIGS. 12 and 13, first gear segment 22 comprises a plurality of gear teeth 66 configured to mesh with oppositely facing gear teeth 68 formed in second gear segment 54. The particular tooth lay out of gear segments 22 and 54 of the preferred embodiment is shown in the two tables represented below. In these tables, certain points designated as $P_n$ of gear segments 22, 54 are identified by a set of X,Y coordinates centered about first pivot point 50 and second pivot point 62, respectively. For example and referring to FIG. 12 and Table 1 (the first gear segment table), $P_{20}$ of first gear segment 22 has coordinates −29.516 mm/−30.793 mm relative to first pivot point 50. In addition, in these two tables, "R" designates the radius of a curve extending between two neighboring points. For example and still referring to FIG. 12 and Table 1, between neighboring points $P_{28}$ and $P_{30}$ the radius R is 5.9 mm.

TABLE 1

FIRST GEAR SEGMENT

| P | X | Y | R |
|---|---|---|---|
| 1 | −38.773 | −8.6 | |
| | | | 7.2 |
| 3 | −34.327 | −9.446 | |
| | | | 8.36 |
| 5 | −30.518 | −10.355 | |
| | | | 1.6 |
| 6 | −30.099 | −12.431 | |
| | | | 7.46 |
| 8 | −32.508 | −15.078 | |
| | | | 7.88 |
| 10 | −35.862 | −18.288 | |
| | | | 2 |
| 11 | −35.166 | −20.306 | |
| | | | 6.98 |
| 13 | −30.757 | −20.894 | |
| | | | 16.94 |
| 15 | −27.179 | −21.056 | |
| | | | 1.6 |
| 16 | −26.189 | −23.275 | |
| | | | 6.7 |
| 18 | −28.236 | −25.937 | |
| | | | 6.2 |
| 20 | −29.516 | −30.793 | |
| | | | 2 |
| 21 | −28.252 | −31.711 | |
| | | | 6.24 |
| 23 | −23.865 | −29.855 | |
| | | | 22 |
| 25 | −21.552 | −27.576 | |
| | | | 1.6 |
| 26 | −18.85 | −28.418 | |
| | | | 22 |
| 28 | −18.322 | −31.83 | |
| | | | 5.9 |
| 30 | −15.886 | −35.897 | |
| | | | 2 |
| 31 | −14.297 | −35.671 | |
| | | | 6.58 |
| 33 | −12.418 | −31.096 | |
| | | | 6.72 |
| 35 | −11.247 | −27.61 | |
| | | | 1.6 |
| 36 | −9.378 | −27.084 | |
| | | | 8 |
| 38 | −6.729 | −29.854 | |
| | | | 8.96 |
| 40 | −3.882 | −33.453 | |
| | | | 2 |
| 41 | −1.768 | −32.991 | |
| | | | 7.02 |
| 43 | −0.809 | −28.437 | |
| | | | 8.1 |
| 45 | 0.267 | −25.038 | |
| | | | 1.6 |
| 46 | 2.272 | −24.443 | |
| | | | 9 |
| 48 | 5.19 | −27.315 | |
| | | | 8.38 |
| 50 | 8.213 | −30.862 | |

TABLE 2

SECOND GEAR SEGMENT

| P | X | Y | R |
|---|---|---|---|
| 1 | 36.145 | 18.5 | |
| | | | 6.2 |
| 3 | 39.879 | 18.323 | |
| | | | 6.44 |
| 5 | 43.952 | 17.796 | |
| | | | 2 |
| 6 | 44.893 | 15.697 | |
| | | | 5.38 |
| 8 | 41.783 | 12.712 | |
| | | | 9.7 |
| 10 | 38.681 | 11.207 | |
| | | | 1.6 |
| 11 | 38.479 | 8.401 | |
| | | | 19 |
| 13 | 41.455 | 6.747 | |
| | | | 7.46 |
| 15 | 45.246 | 4.555 | |
| | | | 2 |
| 16 | 44.869 | 2.207 | |
| | | | 6.62 |
| 18 | 40.877 | 0.823 | |
| | | | 8.14 |
| 20 | 37.585 | −1.016 | |
| | | | 1.6 |
| 21 | 37.479 | −3.281 | |
| | | | 7.38 |
| 23 | 40.92 | −5.185 | |
| | | | 7.7 |
| 25 | 44.858 | −6.645 | |
| | | | 2 |
| 26 | 45.05 | −9.004 | |
| | | | 6.28 |
| 28 | 41.541 | −11.262 | |
| | | | 8.52 |
| 30 | 38.66 | −13.907 | |
| | | | 1.6 |
| 31 | 39.219 | −16.147 | |
| | | | 6.72 |
| 33 | 42.812 | −17.095 | |
| | | | 5.28 |
| 35 | 46.904 | −18.632 | |
| | | | 2 |
| 36 | 47.033 | −20.718 | |
| | | | 5.14 |
| 38 | 43.299 | −23.093 | |
| | | | 12.44 |
| 40 | 40.107 | −23.904 | |
| | | | 1.6 |
| 41 | 39.395 | −26.69 | |
| | | | 12.72 |
| 43 | 42.033 | −28.762 | |
| | | | 6.9 |
| 45 | 44.595 | −32.527 | |
| | | | 2 |
| 46 | 43.717 | −34.266 | |
| | | | 6.74 |
| 48 | 39.354 | −34.21 | |
| | | | 8.56 |
| 50 | 35.461 | −34.18 | |

Those skilled in the art will readily appreciate that while the coordinates of these points are given in millimeters, other units of length or measurement systems are equally applicable.

Figures 4, 14:
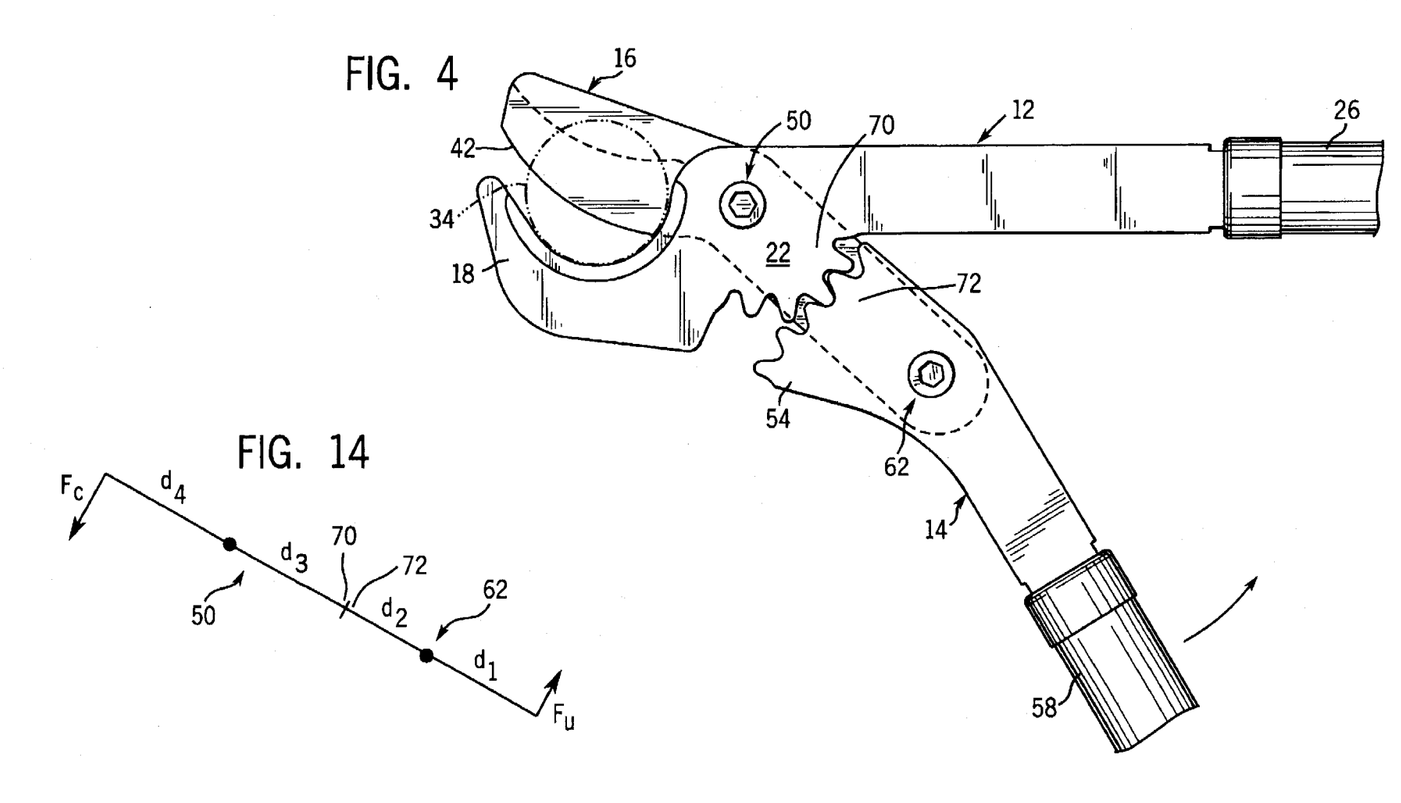
FIG. 4 is a bottom plan view of the lopper of FIG. 2, represented approximately at sixty percent through the cutting stroke.
FIG. 14 is a schematic diagram of the lopping shears of the present invention, exemplifying the relationship between the first and second gear segments.
Figure 5:
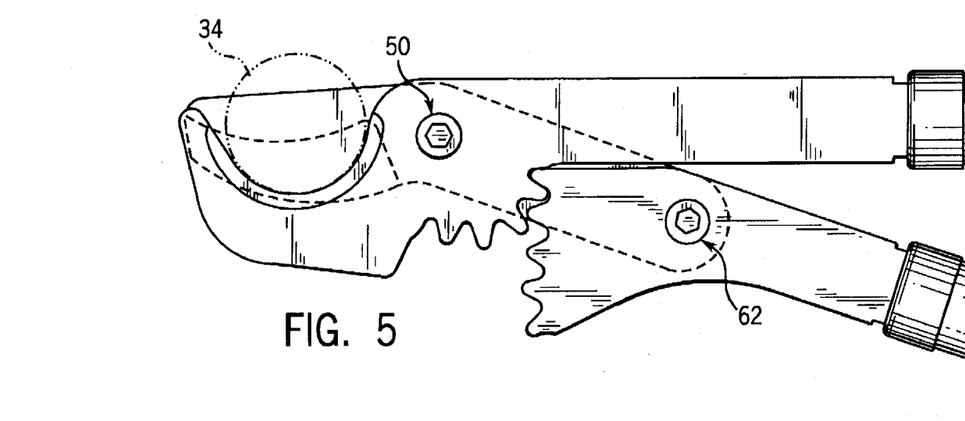
FIG. 5 is a bottom plan view of the lopper of FIG. 2, represented at the end of the cutting stroke.
Figure 6:
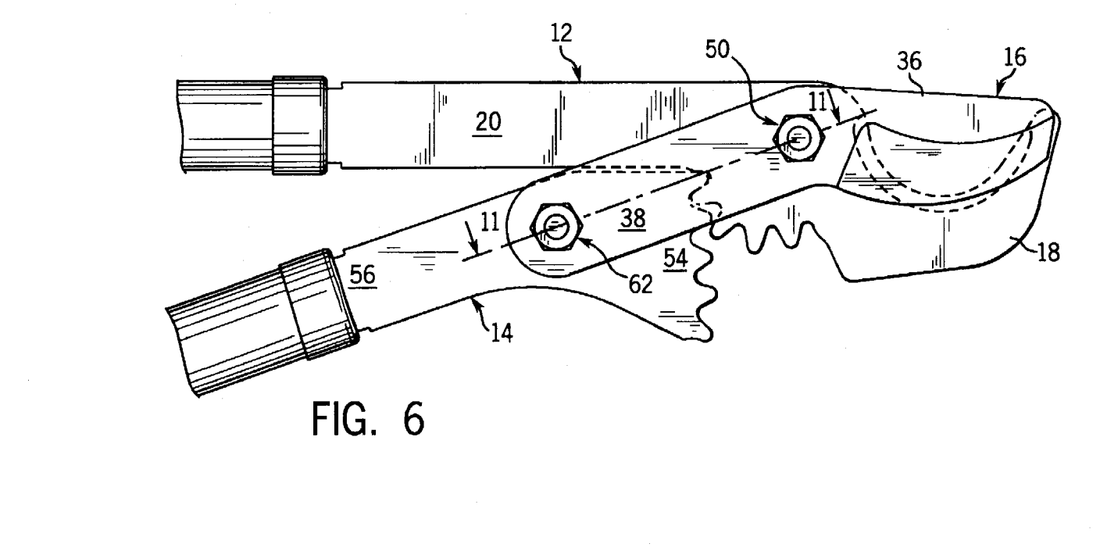
FIG. 6 is a top plan view of the lopper of FIG. 2, represented at the end of the cutting stroke.
Figure 7:
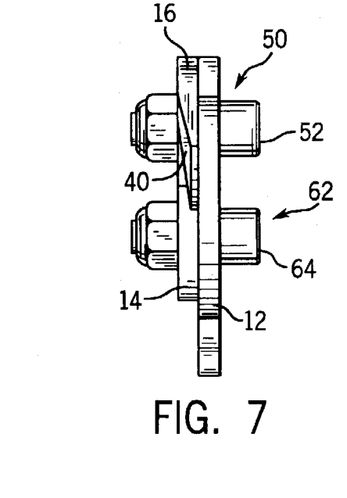
FIG. 7 is a front elevational view of the lopper of FIG. 2, represented at the end of the cutting stroke.
Figure 8:
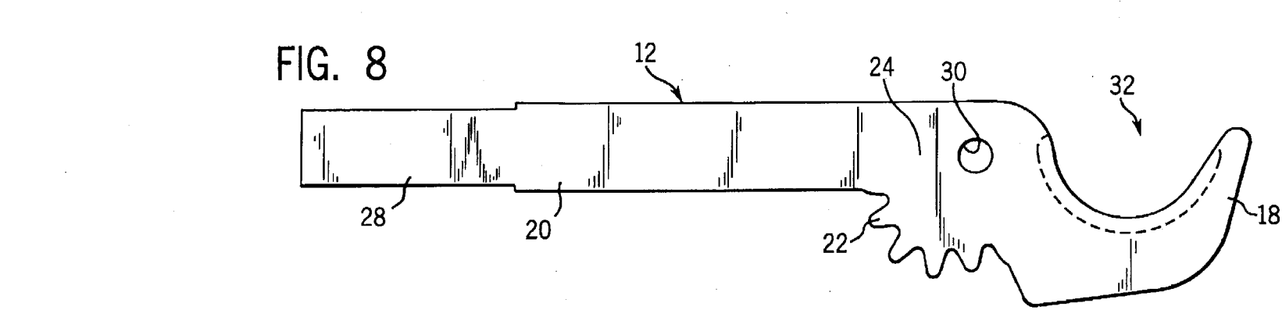
FIG. 8 is a top plan view of the first elongated member of the lopper shown in FIG. 2.
Figure 9:
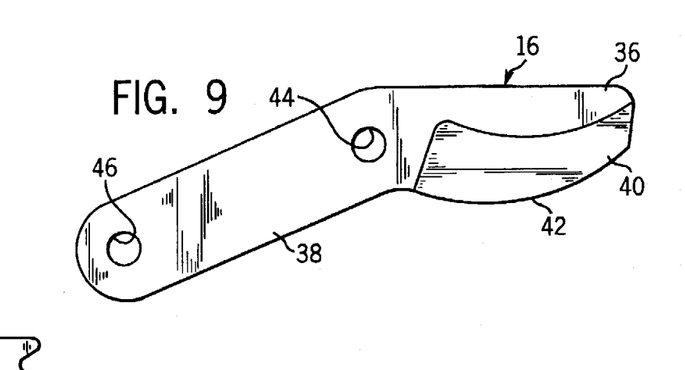
FIG. 9 is a top plan view of the blade of the lopper shown in FIG. 2.
Figure 10:
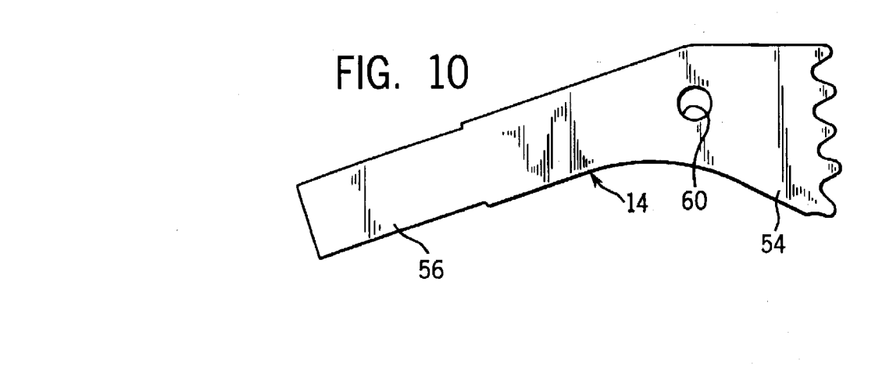
FIG. 10 is a top plan view of the second elongated member of the lopper shown in FIG. 2.
Figure 11:
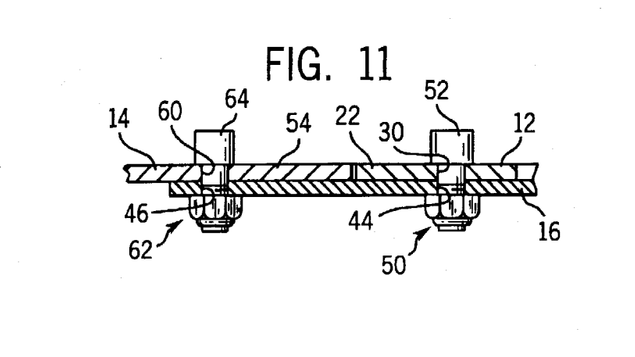
FIG. 11 is a partial sectional view, taken substantially along line 11—11 shown in FIG. 6.

Referring to FIGS. 4, 12, and 13, second member 14 is pivotally connected to plate 16 about second pivot point 62 so that first and second gear segments 22, 54, are intermeshing in first and second regions, 70, 72, respectively. First and second gear segments 22, 54, are further characterized by first and second pitch lines 74, 76, respectively. As seen in FIGS. 12 and 13, first pitch line 74, which represents the imaginary line that rolls without slippage with second pitch line 76 of mating second gear segment 54, is not concentric about first pivot point 50. Rather, and referring also to FIG. 14, $d_3$, which represents the distance between first pivot point 50 and first region 70, varies as first and second handles 26, 58 are pivoted about the first and second pivot points, 50, 62, respectively. Similarly, second pitch line 76 of mating second gear segment 54 is not concentric about second pivot point 62. Instead, $d_2$ which is the distance between second pivot point 62 and second region 72 also varies with scissor-action of first and second handles 26, 58.

As illustrated in FIGS. 12 and 13 and Tables 1 and 2, $d_3$ reaches a maximum at a predetermined point lying between $P_{20}$ and $P_{21}$. Conversely, because the distance between first and second pivots 50, 62, (i.e., the distance between second and third apertures 44 and 46), is fixed, $d_2$ necessarily reaches a minimum at that same point. The effect of this equal but opposite variation of distances $d_2$ and $d_3$ on the cutting force $F_c$ applied to workpiece 34 is reflected in the following equation using the moment of the forces:

$$F_c = K \cdot F_u \cdot \frac{d_1 + d_2}{d_2}$$

with $$K + \frac{d_3 + d_2}{d_4}$$

wherein as illustrated on FIG. 14:

$F_u$ is the force applied by a user at an application point along second member 14;

$d_1$ is the distance between second pivot point 62 and the application point; and $d_4$ is the distance between first pivot point 50 and the point at which $F_c$ is applied to workpiece 34.

$F_c$ can also be written as:

$$F_c = K \cdot F_u + K \cdot F_u \cdot \frac{d_1}{d_2}$$

As is readily apparent from the foregoing equations, K and $d_1$ being constant, and for the same amount of force $F_u$ applied by the user to tool 10, $F_c$ will reach a maximum value when $d_2$ is minimum (i.e., $d_3$ is maximum), which occurs as explained above at the point lying between $P_{20}$ and $P_{21}$. Accordingly, the present invention, in which the mating configuration of gear segments 22, 54 minimizes $d_2$ at a predetermined point falling at approximately sixty percent of the cutting stroke, allows tool 10 to generate maximum leverage at that point, which is at the most desired point of the cutting stroke where the density of workpiece 34 is highest.

It is understood that the above description is of a preferred exemplary embodiment of the invention, and that the invention is not limited to the specific forms that the invention is not limited to the specific forms described. For example, tools in accordance with the invention having first and second gear segments of the type disclosed in the foregoing could include a pair of opposed cutting blades, as in bypass loppers, instead of a blade cooperating with an anvil as described in the preferred embodiment. In addition, such loppers can be manufactured in various ways. For example, they could be fabricated out of stamped plates, or out of forged metal; or they could include some components made of a moldable material such as plastic, in each case without affecting their functional characteristics. Furthermore, even though the preferred embodiment of the invention shows intermeshing teeth having a particular configuration, those skilled in the art will appreciate that the intermeshing function could be provided in other ways without departing from the scope of this invention. Such other constructions and configurations are, nevertheless, considered to be within the scope of this invention. Accordingly, these and other substitutions, modifications, changes and omissions may be made in the design and arrangement of the elements and in the manufacturing steps disclosed herein without departing from the scope of the appended claims.

I claim:

1. A variable force lopper, comprising:

a metal plate having a first pivot point, a forwardly extending blade and a rearwardly extending tang provided with a second pivot point spaced apart from the first pivot point by a predetermined distance;

a first elongated member pivotally connected to the plate at the first pivot point, the first member having a forwardly extending jaw configured to cooperate with the blade to sever a workpiece received in a bight formed by the jaw, a rearwardly extending arm, and a first gear segment intermediate the jaw and the arm; and a second elongated member having a rearwardly extending portion and an opposed second gear segment, the second member being pivotally connected to the plate at the second pivot point so that the first and second gear segments are intermeshing in first and second regions, respectively;

wherein the second gear segment is configured such that a second distance separating the second pivot point from the second region is smallest at a predetermined point of blade travel across the bight.

2. The lopper of claim 1 further wherein the first gear segment is configured such that, about a point where the blade severs the workpiece, a first distance separating the first pivot point from the first region is smallest.

3. The lopper of claim 1 further wherein the first and second gear segments are configured such that the predetermined point is about sixty percent of the travel of the blade across the bight as the blade severs the workpiece.

4. The lopper of claim 1 wherein the jaw is configured as a second blade to cooperate with the blade.

5. The lopper of claim 1 wherein the first elongated member is formed of metal.

6. The lopper of claim 1 wherein the first and second elongated members are formed of metal.

7. The lopper of claim 1 wherein the first elongated member is formed of plastic.

8. The lopper of claim 1 wherein the first and second elongated members are formed of a moldable material.

9. The lopper of claim 1 wherein in the first member at least the first gear segment is formed of a moldable material.

10. The lopper of claim 1 wherein in the second member at least the second gear segment is formed of a moldable material.

11. A variable force lopper, comprising:

a metal plate having a first pivot point, a forwardly extending blade and a rearwardly extending tang provided with a second pivot point spaced apart from the first pivot point;

a first elongated member pivotally connected to the plate at the first pivot point, the first member having a forwardly extending jaw configured to cooperate with the blade to sever a workpiece received in a bight formed by the jaw, a rearwardly extending arm, and a first gear segment intermediate the jaw and the arm;

a second elongated member having a rearwardly extending portion and an opposed second gear segment, the second member being pivotally connected to the plate at the second pivot point so that the first and second gear segments are intermeshing in first and second regions, respectively; and means for imparting a variable cutting force to the workpiece as the blade travels across the bight.

12. The lopper of claim 11 wherein the imparting means comprises the gear segments configured so that a first distance separating the first pivot point from the first region is maximum at a predetermined point of the travel of the blade across the bight.

13. The lopper of claim 11 wherein the variable force imparted to the workpiece is function of the formula:

$$F_c = K \cdot F_u \cdot \frac{d_1 + d_2}{d_2}$$

with $$K + \frac{d_3 + d_2}{d_4}$$

wherein:

$F_c$ is the cutting force applied to the workpiece;

$F_u$ is the force applied by a user at an application point along the second member;

$d_2$ is the distance between the second pivot point and the second region;

$d_3$ is the distance between the first pivot point and the first region;

$d_1$ is the distance between the second pivot point and the application point; and $d_4$ is the distance between the first pivot point and a point at which $F_c$ is applied to the workpiece.

14. The lopper of claim 13 wherein $F_c$ is maximum at a predetermined point of blade travel across the bight.

15. The lopper of claim 14 wherein the gear segments are configured so that the predetermined point is about sixty percent of the travel of the blade across the bight.

16. A variable force pivoted tool, comprising:

a first elongated member having a forwardly extending first jaw merging into a first gear segment, a first handle mounted onto an arm extending rearwardly from the first gear segment, and a first aperture formed in a region of the first gear segment;

a metal plate having a forwardly extending cooperating jaw, a rearwardly extending tang and a second aperture intermediate the cooperating jaw and the tang, the tang being provided with a third aperture spaced apart from the second aperture by a predetermined distance, the metal plate being pivotally connected to the first member at a first pivot point comprising the first and second apertures; and a second elongated member having a second gear segment and a second handle mounted onto a portion extending rearwardly from the second gear segment, the second gear segment having a fourth aperture, the second member being pivotally connected to the plate at a second pivot point comprising the third and fourth apertures;

the first and second gear segments intermeshing in first and second regions, respectively, and being configured so that a first distance separating the first pivot point from the first region and a second distance separating the second region from the second pivot point vary in equal but opposite amounts as the first and second handles are pivoted about the first and second pivot points, respectively.

17. The tool of claim 16 wherein the first jaw and the cooperating jaw are configured as blades.

18. The tool of claim 16 wherein the first jaw is configured as an anvil and the cooperating jaw is configured as a blade.

19. The tool of claim 16 wherein the gear segments are configured so that the second distance is smallest at a predetermined point of travel of the cooperating jaw relative to the first jaw in response to closing movement of the handles.

20. The tool of claim 19 wherein the predetermined point is about midpoint through the travel of the cooperating jaw.

* * * * *

UNITED STATES PATENT AND TRADEMARK OFFICE
CERTIFICATE OF CORRECTION

PATENT NO. : 5,689,888
DATED : November 25, 1997
INVENTOR(S) : Linden

It is certified that error appears in the above-identified patent and that said Letters Patent is hereby corrected as shown below:

Claim 2, line 4, replace "smallest" with --largest--.

Signed and Sealed this

Eighteenth Day of May, 1999

Attest:

Q. TODD DICKINSON

Attesting Officer

Acting Commissioner of Patents and Trademarks